Oct. 16, 1934.  J. C. OLSEN  1,977,081
OIL SEAL
Filed May 21, 1932
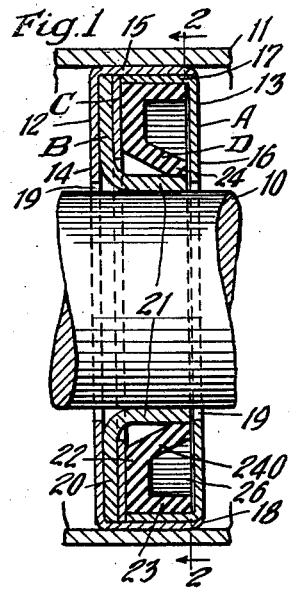
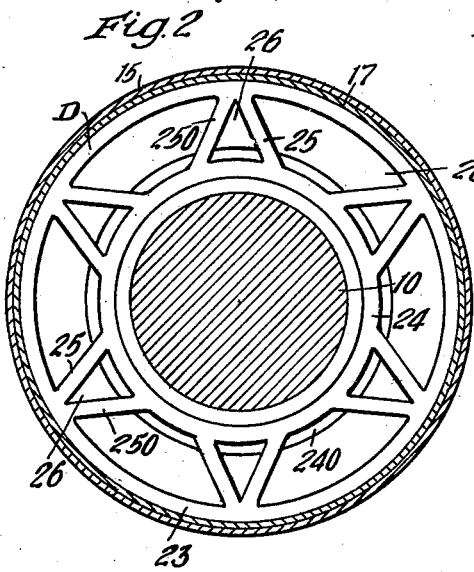
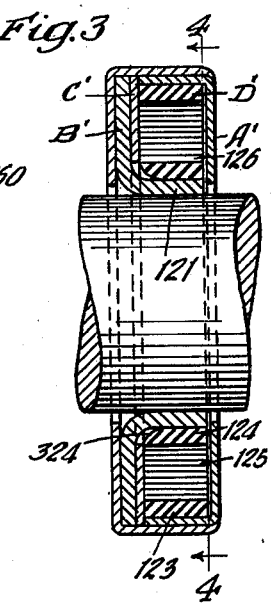
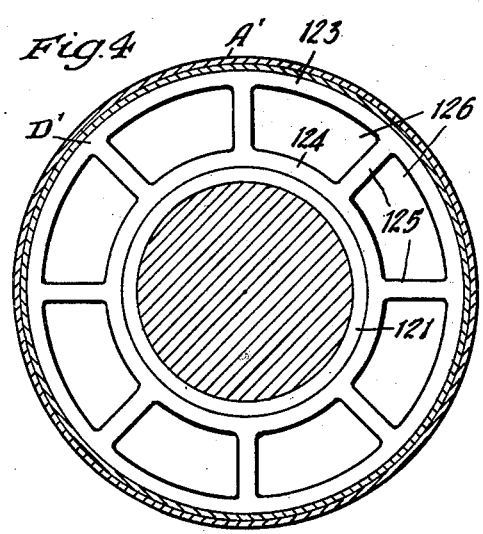
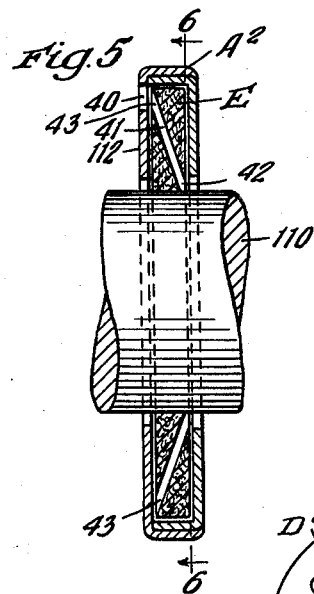
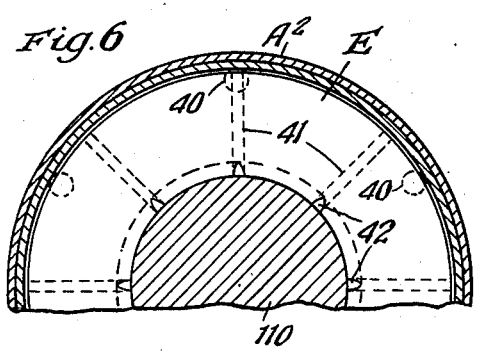
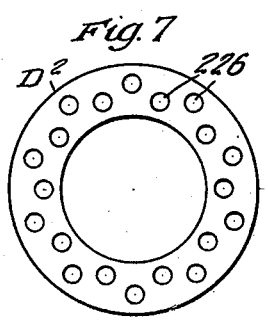
Inventor
John C. Olsen
By Joseph Harris
His Atty.

Patented Oct. 16, 1934

1,977,081

UNITED STATES PATENT OFFICE 1,977,081

OIL SEAL

John C. Olsen, Chicago, Ill., assignor to Flexible Steel Lacing Company, Chicago, Ill., a corporation of Illinois Application May 21, 1932, Serial No. 612,709

4 Claims. (Cl. 286—5)

This invention relates to improvements in oil seals.

One object of the invention is to provide a seal or retainer for oil, grease or other lubricant for shafts and which may be manufactured economically, sold and shipped completely assembled as a unitary article and, as such, readily placed in operative position.

Another object of the invention is to provide a shaft oil seal having a flexible packing surrounding and engaging the shaft with a uniformly distributed resilient pressure so arranged that, while insuring snug contact to prevent escape of the oil, the constricting pressure is relatively light, so as to prevent undue friction and wear.

Another object of the invention is to provide in an oil seal of the character indicated, a flexible packing having an immovable radial flange section and a cylindrical sleeve or shaft-engaging section wherein the latter is held under a relatively light, yieldable pressure substantially localized around the free edge of the shaft-engaging section of the packing.

A specific object of the invention is to provide an improved and resilient pressure ring particularly adapted for cooperation with a flexible packing of the type above referred to.

Still another object of the invention is to provide an oil seal of centrifugal or impeller type such that any lubricant accumulating on either or both sides of the impeller adjacent the shaft will be pumped back directly into the bearing chamber of the shaft.

Still another object of the invention is to provide an oil seal of the type indicated in the preceding paragraph wherein the same may be applied in position as a unitary assembly by slipping the assembly endwise of the shaft.

Other objects of the invention will more clearly appear from the description and claims hereinafter following.

In the drawing forming a part of this specification, Figure 1 is a diametrical, sectional view, showing one embodiment of the improved oil seal in operative relation with respect to a shaft and shaft housing. Figure 2 is a vertical, sectional view, corresponding to the section line 2—2 of Figure 1. Figure 3 is a view similar to Figure 1, illustrating another embodiment of the invention. Figure 4 is a vertical, sectional view, corresponding to the section line 4—4 of Figure 3. Figure 5 is a diametrical, sectional view similar to Figure 1, illustrating a still different embodiment of the invention. Figure 6 is a vertical, sectional view, corresponding to the section line 6—6 of Figure 5. And Figure 7 is an elevational view of still another form of compression ring.

In said drawing and referring first to the construction illustrated in Figures 1 and 2, 10 indicates a portion of a shaft and 11 portions of the surrounding shaft housing with which the improved oil seal is adapted to be employed, it being understood that the interior of the housing 11 is cylindrical and concentric with the shaft in the form shown. It will further be understood that the adjacent bearing for the shaft 10 will be at the left of the parts illustrated in Figure 1, the same holding true with respect to the forms illustrated in Figures 3 and 5.

The improved oil seal as shown in Figures 1 and 2, comprises broadly, a shell or casing designated generally by the reference character A; a packing B; a clamping plate C; and an inherently resilient pressure ring D. For convenience in description, it will be understood that the term "oil" as herein used is intended to embrace not merely oil but other lubricants, such as grease, of a liquid and/or semi-liquid nature.

The casing A is preferably composed of two cup-shaped sheet metal members 12 and 13. The member 12 has a radially extending side wall 14 and a circular peripheral wall 15 and the member 13 has a corresponding radial side wall 16 and peripheral wall 17, the latter being snugly telescoped within the peripheral wall 15, but of lesser width than the latter so as to operate as a spacer for the clamping plate C, as hereinafter described. The two members 12 and 13 with the other parts within the casing, are held in assembled relation by any suitable means, such as by spinning the free edge 18 of the outer member over the corner of the inner member 13, as shown, thus adapting the oil seal for shipment and application as an assembled unitary structure. Both side walls of the casing are centrally apertured, as indicated at 19—19, to accommodate the shaft 10 which passes therethrough, said openings 19 being made of slightly greater diameter than that of the shaft with which intended to cooperate so as not only to facilitate slipping the seal assembly lengthwise of the shaft but also to accommodate any slight eccentricity of the shaft that may occur when it is rotating.

The washer B may be made of any suitable pliable and/or flexible material such as leather, fabric, or cork composition. The washer is made of annular form with a radially extending flange section 20 and a sleeve or cylindrical section 21. In actual practice, the sleeve section 21, which is shown as truly cylindrical when applied on the shaft in Figure 1, will initially be formed with a taper toward the right, as viewed in Figure 1, that is with the free edge portion of the sleeve section of somewhat lesser diameter than the shaft over which it is intended to be applied so that, when applied, it will be somewhat distended to the true cylindrical form shown and thus provide a snug fluid-tight running engagement with the shaft. The flange section 20 of the washer will be made, preferably, of such outside diameter as to fit snugly within the peripheral wall 15 and will be held tightly clamped against the end wall 14 by the annular clamping plate or washer C, which in turn is held in its fixed position by the spacing inner telescoped wall 17 of the other member 13. In this manner, the washer B, considered as an entirety, is held against movement transverse to the shaft but with the sleeve portion 21 thereof free to adjust itself laterally in consonance with any eccentric movement of the shaft 10. The clamp plate C, preferably of sheet metal, is made with the interior opening thereof of sufficiently enlarged diameter to permit the necessary bending or flexing of the washer around the inner edge of the clamping plate without danger of chafing or cutting thereinto.

The improved pressure ring D may be made of any suitable material, that is inherently resilient and compressible and that will not be injuriously or appreciably injuriously affected by any of the ordinary lubricants encountered in service. One such material suitable for the purpose is a specially prepared rubber compound now obtainable commercially and which will not swell or disintegrate under the action of oil. In the specific form of pressure ring D shown in Figure 1, the same is of generally annular formation with a radially extending section or web 22, an outer peripheral cylindrical section or wall 23, an inner relatively narrow annular section 24 united with the web section 20 by an inwardly flaring section 240, and a plurality of ribs or webs 25 and 250, with intervening cored out recesses 26 and 260. The ribs 25 and 250 are uniformly spaced circumferentially, each pair of ribs 25 and 250 converging outwardly and joining the peripheral wall 23 at a substantially common point, the inner ends of said ribs uniting with the annular sections 24 and 240 at points which are substantially equally distant therearound, for the purpose hereinafter described.

The ring D is disposed within the casing in the manner best shown in Figure 1, that is, with the radial section 22 up against the clamping plate C and with the free edge of the inner annular section 24 flush or substantially flush with the free edge of the washer B. With this arrangement, it will be observed that there is provided a continuous area or surface contact between the resilient ring D and the free edge zone of the washer sleeve section 21. There is thus provided a perfectly uniform, yieldable but relatively light feather edge pressure on the washer edge and between the latter and the shaft. As will be understood, the inner diameter of the ring D is initially made slightly less than the outside diameter of the washer sleeve section 21 when the latter is distended to encircle the shaft 10 so as to insure constancy of the constricting but relatively light pressure from the ring D. By arranging the ring ribs 25 and 250, as shown, the annular section 24 is uniformly braced but nevertheless very readily and uniformly yieldable at any point therearound, it being understood that the ribs 25 and 250 will flex slightly as any eccentric movement is imparted to the ring section 24. It will also be noted that there is no constricting pressure on the washer section 21 adjacent the bend in the latter, but that the constricting pressure is concentrated in the edge zone of the latter, as previously described, and this disposition of the constricting pressure has been found to be exceedingly efficient and effective in preventing passage of the lubricant lengthwise of the shaft from left to right, as viewed in Figure 1. It will further be observed that the construction of the resilient ring is such as to maintain it in proper place with the application of the pressure always at the desired point.

Referring next to the construction shown in Figures 3 and 4, the casing A' is or may be the same as the casing A, first described, and the arrangement of the washer B' and clamping ring C' are the same as the corresponding parts, previously described. The only change is in the form of the compression ring D' which, as best shown in Figure 4, comprises inner and outer annular sections 124 and 123 united by uniformly spaced radially extending ribs 125, the cored recesses 126 extending entirely through the ring. In this particular ring, the same is chamfered or flared, as indicated at 324, so as to provide ample clearance for the bend in the washer and permit its flexing. In this arrangement, the constricting pressure is spread over a greater area of the washer section 121 but functions similarly to the ring D.

Referring to Figure 7, the ring D² there shown is composed of similar material to the rings D and D' and is of true annular form provided with a series of preferably round holes or openings 226 uniformly spaced and arranged in two circular series to provide for the necessary light yielding compression, as will be understood.

Referring next to the seal illustrated in Figures 5 and 6, the casing A² there shown is formed in substantially the same manner as the casing A but is of somewhat lesser width. The casing member 112 thereof is additionally provided with one or more discharge openings or ports 40 located in the upper half of the casing when the latter is in position in the shaft housing, it being understood that the discharge ports 40 are on that side adjacent the bearing for the shaft and so as to discharge the lubricant back into the bearing chamber, as hereinafter described.

In this particular embodiment, a rotatable impeller, disc or slinger E is employed, the same having a relatively close but running fit around all surfaces thereof with the corresponding adjacent interior surfaces of the casing A². Said impeller E is preferably made of material which is relatively rigid and hard but which nevertheless is sufficiently compressible that, when the seal is slipped endwise of the shaft, the impeller will form a fluid seal tight and driving fit with the shaft 110 so that when the shaft is rotated, the impeller will likewise be rotated in unison with it. The impeller E is provided with a plurality of uniformly spaced passages 41 therein, each of which extends in a general radial direction and also a diagonal direction with an intake port 42 at its inner end and a delivery port 43 at its outer end. The intake ports 42 are on that side of the impeller remote from the bearing or oil chamber and located closely adjacent the shaft and the delivery ports 43 are on the opposite side of the impeller and located substantially at the periphery thereof and in such position as to successively pass the casing delivery ports 40.

The seal shown in Figures 5 and 6 operates in the manner of a centrifugal pump substantially as follows. As oil or other lubricant seeps lengthwise of the shaft toward the right, it first encounters the impeller E and will be picked up by the inner radial face thereof and, through centrifugal action, will be gradually thrown radially outward until opposite the ports 40 where it will be thrown back into the bearing chamber through the ports 40. At the same time, a suction action is produced through the passages 41 from the inlets 42 thereof to the outlets 43. In the event any of the lubricant seeps around the periphery of the impeller E and down the outer radial face thereof toward the shaft, or in the event any lubricant should seep through the joint between the impeller and shaft to the outer side of the impeller, the same will be sucked or drawn in through the inlet ports 42 as it comes adjacent thereto and will be thrown out centrifugally through the passages 41 and ultimately through the outlet ports 40 back into the oil chamber. In the drawing, an appreciable clearance has been shown between the surfaces of the impeller E and opposed surfaces of the casing $A^2$. This spacing or clearance has been exaggerated in order to better illustrate the details of construction, but in actual practice the thickness of the impeller E will preferably be made about $\frac{1}{32}$ of an inch less than the interior width of the casing $A^3$ so as to leave only approximately 1/64" clearance for running fit between each surface of the impeller and casing $A^3$.

The seals illustrated in Figures 1 to 4 are best adapted for relatively low speed operation, whereas the form shown in Figures 5 and 6 is particularly adapted for shafts running at high speeds.

From the preceding description, it will be seen that the oil seals described may be readily manufactured and sold as assembled units; that the same are applied in position by merely slipping the units lengthwise of the shaft into proper position and, when in position, providing a fluid-tight but rotative joint between the seal and shaft and a fluid-tight joint between the casing of the seal and the surrounding housing. Each of the component parts is such as to readily lend itself to inexpensive mass production; and the parts may be readily assembled without special apparatus and, when assembled, retained in their assembled position by spinning the outer casing member over the inner casing member.

While the preferred manner of carrying out the invention has been illustrated and described, it will be understood that various changes and modifications may be made without departing from the spirit of the invention and all such changes and modifications are contemplated that come within the scope of the claims appended hereto.

What is claimed is:

1. As an article of manufacture, a seal for insertion within a shaft housing, said seal including: a sheet metal casing having axially spaced side walls and a peripheral wall all rigidly assembled to provide a unitary structure, said side walls being apertured to accommodate the shaft and the inner of said side walls having a discharge opening therein; an impeller retained by and rotatable within the casing and centrally apertured to receive the shaft therethrough and provide a friction drive fit with the shaft, said impeller being provided with passages therein each extending radially and diagonally from one side to the other thereof.

2. As an article of manufacture, a seal for insertion endwise as a single unit within a shaft housing, said seal including: an annular sheet metal casing having axially spaced and apertured side walls to accommodate the shaft and provided with a discharge port in the inner of said side walls; a single piece annular disc retained by and within the casing and adapted for a relatively snug running fit with the walls thereof and a friction drive fit with the shaft, said disc being provided with suction passages therethrough extending from the outer to the inner faces of the disc the outlet ends of said passages being disposed radially outwardly of the inlet ends of said passages.

3. A seal of the character described for a shaft rotatable in a bearing comprising: means adapted to surround the shaft and provide an annular chamber open to the shaft; an impeller adapted to be carried by the shaft and rotatable within said means with a relatively close but running fit with the adjacent radial and peripheral surfaces of said means, said impeller having a plurality of passages extending therethrough, each with a suction admission port at the end thereof adjacent the shaft on the side of the impeller remote from the bearing, and a delivery port at its opposite end on the side of the impeller nearest the bearing and adjacent the periphery of the impeller, said means having a lubricant discharge port from said chamber direct to the bearing chamber of the shaft, whereby lubricant accumulating on either or both sides of the impeller will be centrifugally directly discharged into the bearing chamber through said discharge port.

4. As an article of manufacture, a seal for insertion endwise within a shaft housing and providing a friction seal therewith, said seal including: a sheet metal casing having a periphery and inner and outer side walls all substantially permanently assembled as a single unit and insertable as such, the side walls being axially apertured to freely accommodate a shaft therethrough and the inner side wall having a discharge port; an annular disc retained by and within said casing, said disc being of relatively hard and rigid material but sufficiently compressible to provide a driving fit with the shaft when slipped longitudinally thereon, said disc being also provided with passages therein extending from one side to the other thereof, the inlet ends of the passages being disposed radially nearer the shaft than the outlet ends of the passages and said outlet ends being located so as to successively move adjacent said discharge port.

JOHN C. OLSEN.